3,832,197
HARDENING-RELEASE OF CROSSLINKING IONS FROM A COMPLEX IN AN EMULSION
Joseph De Witt Overman, Wilmington, Del., assignor to E. I. du Pont de Nemours and Company, Wilmington, Del.
No Drawing. Filed Oct. 26, 1971, Ser. No. 192,567
Int. Cl. C08f 45/24; C09h 7/00
U.S. Cl. 106—125          4 Claims

ABSTRACT OF THE DISCLOSURE

Polymeric emulsions are hardened by crosslinking with multivalent cations that are initially present in the emulsions in the form of complexes with complexing agents. Hardening of the emulsions occurs when the crosslinking cations are released from the complexes, e.g., by displacement with other cations.

BACKGROUND OF THE INVENTION

Field of the Invention

This invention relates to the use of crosslinking multivalent cations to harden layers of polymeric emulsions, and, in a particularly preferred embodiment, to the hardening of gelatino silver halide emulsions.

Description of the Prior Art

It is well known in the photographic arts that gelatin-based silver halide emulsions can be hardened by the addition of trivalent chromium compounds to the emulsion, through crosslinking reactions between the chromium atoms and the gelatin molecules. When chromium hardeners are added in the course of manufacture of the emulsion, the resulting crosslinking may cause such an increase in the apparent viscosity of the emulsion that the emulsion is no longer sufficiently fluid for uniform coating on a substrate. To permit better control of the viscosity, it is also known to add organic groups, e.g., oxalates, citrates, tartrates, and the like, which will form complexes with the chromium and, in effect, compete with the crosslinking reactions of the chromium with the gelatin. While viscosity may be kept at a workable level in this way, the maximum desired hardening effect is thereby defeated, as evidenced by an insufficient elevation of the melting point of the emulsion. Application of a solution containing chromium ions to an emulsion layer directly can involve a precipitation problem at solution pH usually employed in coating. These problems are overcome by the present invention which permits the preparation of gelatino silver halide emulsions of desirably high melting point by the incorporation of hardening agents at the time of compounding of the emulsion or thereafter without undesirable increases in apparent viscosity or precipitation of chromium compounds.

SUMMARY OF THE INVENTION

This invention is a process for hardening polymeric emulsions comprising producing first, crosslinking, multivalent cations in the emulsion by release of said first, crosslinking, multivalent cations from complex with a complexing agent. The first, crosslinking, multivalent cations may be released from complex by displacing them with second multivalent cations.

The process may be carried out by making an emulsion containing the first, crosslinking, multivalent cations in complex with a complexing agent, forming the emulsion into a layer, for example, by coating it on a substrate, and treating the layer with a solution containing the second multivalent cations, whereby the polymer is hardened by crosslinking resulting from displacement of the first multivalent cations from complex. Alternatively, the second (displacing) cations may be incorporated in the original emulsion, and the first (crosslinking) cations together with complexing agent may be introduced in the after-treatment step. In either case, crosslinking multivalent cations are produced in the emulsion layer by release from complex, and the layer is thereby hardened.

DESCRIPTION OF THE PREFERRED EMBODIMENTS

The invention is a process for hardening polymeric emulsions comprising producing first, crosslinking, multivalent cations in the emulsion by release of the cations from a complex. While the scope of the invention includes the release of cations from complex by any procedure, e.g., based on instability or volatility of the organic portion of the complex, the preferred embodiments described herein employ second multivalent cations to displace the first, crosslinking, cations from complex. By this procedure, the apparent viscosity of the emulsion is kept at a level suitable for good coating, but, upon introduction of the second multivalent cations, the latter diffuse or migrate into the emulsion layer, where they displace the first multivalent cations from the complexes they have formed with the complexing agent, thereby releasing the first multivalent cations for crosslinking (i.e., hardening reactions with the polymer molecules in the emulsion layer.

An embodiment of this process wherein the crosslinking cation complex is incorporated in the original emulsion may be more particularly described as comprising the steps of:

(1) Preparing an emulsion comprising:
 (a) A polymeric binding agent,
 (b) A solvent or dispersion medium for said polymeric binding agent,
 (c) A complexing agent capable of forming a complex with multivalent cations, and
 (d) First, multivalent cations capable of crosslinking said polymeric binding agent;
(2) Forming said emulsion into a layer, optionally on a substrate;
(3) Optionally, and preferably, drying the emulsion; and
(4) Thereafter introducing second multivalent cations capable of displacing said first multivalent cations from complex with said complexing agent, whereupon said first multivalent cations crosslink said polymeric binding agent.

The invention relates also to the polymeric layers produced in the manner just described, and, in a particularly preferred embodiment, to a photographic element comprising a colloid silver halide layer containing a trivalent chromium complex and, coated in intimate association therewith and in contiguous relationship thereto, a water-permeable colloid layer containing a complex-breaking cation.

In a preferred embodiment, this invention relates to the hardening of a light-sensitive gelatino silver halide emulsion coated on a substrate, transparent or otherwise, for use in the photographic arts. In this embodiment, the polymer of the emulsion, which serves as a binding agent, is gelatin, and the solvent or dispersion medium is water. It will be understood that in this embodiment the emulsion may contain silver halide grains, sensitizers, color formers, coupling agents, pigments, and other adjuvants customary in the photographic arts but that these additional ingredients are incidental so far as the present invention is concerned.

Other natural and synthetic polymeric binding agents may also be used, either alone or in combination with gelatin, as known in the art. When a polymer is to be used alone, it must have sites available for crosslinking through multivalent cations. When a polymer does not have such reactive sites, it may be used together with gelatin or another polymer that does have reactive sites, so long as the amount of gelatin or reactive polymer in the mixture is sufficient to provide the desired degree of crosslinking or hardening in the final layer. When the polymer is to serve as a component or sole binder for a silver halide photographic system, it must also, of course, meet the usual requirements of such systems as to transparency, efficient dispersing of silver halide grains, ready penetration by processing solutions, and the like, all as will be well understood by those skilled in the art. If the polymer is not water-soluble, it must be soluble in an agent that is also a solvent (a) for the material that will serve as the source of the first multivalent cation or (b) for organic complexes of the first multivalent cation. Likewise, the polymer in solution or the polymer as dry film must be susceptible to penetration or diffusion of the second multivalent cations when they are subsequently introduced.

Among the binder materials that may be used, in place of gelatin or in conjunction with it, are such agents as water-permeable or water-soluble polyvinyl alcohol and its derivatives, e.g., partially hydrolyzed polyvinyl acetates, polyvinyl ethers and acetals containing a large number of intralinear —$CH_2$—CHOH— groups, hydrolyzed interpolymers of vinyl acetate and unsaturated addition- polymerizable compounds such as maleic anhydride, acrylic and methacrylic acid esters and styrene. Suitable compounds of the last-mentioned type are disclosed in U.S. Pats. 2,276,322, 3,276,323, and 2,397,866. Useful polyvinyl acetals include polyvinyl acetaldehyde acetal, polyvinyl butyraldehyde acetal and polyvinyl sodium o-sulfobenzaldehyde acetal. Other useful colloid binding agents include: the poly-N-vinyllactams of U.S. Pat. 2,495,918; various polysaccharides, e.g., dextran, dextrin, and the like; the hydrophilic copolymers described in U.S. Pat. 2,833,650; and hydrophilic cellulose ethers and esters, e.g., hydroxyethyl cellulose. There may also be used water-dispersible butadiene/acrylonitrile copolymers as described in U.S. Pat. 2,836,494, extenders such as polyvinylpyrrolidone, and polymeric matrices such as the polymers of acrylic and methacrylic esters and amides, e.g., poly(ethyl acrylate), as described in U.S. Pats. 3,142,568 and 3,493,379.

As the first multivalent cation, which will crosslink the polymer chains of the binder to harden the emulsion, the preferred agent is trivalent chromium, which may conveniently be incorporated in the emulsion in the form of its soluble salts, e.g., chromium nitrate, chromium acetate. Other multivalent cations that may be used to crosslink the binder polymer are tetravalent titanium and tetravalent zirconium, added to the solution as complexes since their salts generally have very low solubility. A particularly preferred material, especially for gelatin binders, is potassium chrome alum, $CrK(SO_4)_2 \cdot 12H_2O$, employed in the amount of 1 to 4 g., and preferably 1.5 to 3 g., per 100 g. of gelatin.

The complexing agent for the first multivalent cations may conveniently be an organic acid. Especially useful are the dibasic acids, e.g., oxalic, malonic, succinic; the hydroxyacids, e.g., citric, lactic, tartaric; and acid-substituted heterocyclic compounds, e.g., picolinic acid. Since the stability of complexes of the multivalent cations is sensitive to pH, it may be desirable to use the alkali metal salts of the organic acids rather than the acids themselves. Another useful group of complexing agents are the well-known chelating or sequestering agents such as ethylenediaminetetraacetic acid or the alkali metal salts thereof. When the emulsion is to be a light-sensitive silver halide composition, it will be important, of course, that the complexing agent be one that does not introduce or release into the system any agent that will detrimentally affect the protochemistry or sensitometric characteristics of the system.

The amount of complexing agent used in a given instance will depend on the amount of hardening cation employed and on the desired extent of stabilization of viscosity of the emulsion. In general, a useful range is 0.2 to 4 g. of complexing agent per 100 g. of polymeric binding agent. In the preferred embodiment involving gelatin and chrome alum, the preferred complexing agents and amounts are the hydroxyacids (or their alkali metal salts) at 0.4 to 2 g. per 100 g. of gelatin.

The second multivalent cation to be used in a given instance will be chosen with regard to the complexing agent and the first multivalent cation that are to be employed. The requirement is that the second multivalent cation must form complexes that are more stable than those formed with the same complexing agent by the first multivalent cation under the chemical conditions prevailing in a given system. That is, the second multivalent cation must be capable of displacing the first multivalent cation from its complexes. When the first multivalent cation and the complexing agent are the preferred materials already mentioned, i.e., trivalent chromium and an organic acid or alkali metal salt thereof, the second multivalent cation may usefully be $Mg^{+2}$, $Ca^{+2}$, $Ni^{+2}$, $Al^{+3}$, $Zn^{+2}$, $Cd^{+2}$, or $Co^{+2}$. These cations will conveniently be employed in the form of their soluble salts. It is also evident that the second multivalent cation must not disturb the desired photochemical characteristics of the silver halide system, i.e., preferably it should itself be photochemically active.

The amount of second multivalent cation or its salt to be included in the overcoating formulation will, of course, be governed in part by the intended coating weight, as well as by the desired extent of release of the first (hardening) cation from its complex, i.e., by the extent of final hardening desired. The efficiency of the second cation in breaking the complex of the first cation must also be considered. In some instances, the first and second cations may compete for the complexing agent, and the result is an equilibrium at some level between the complexes of the two cations. Thus, it will generally be desirable to use an excess of the complex-breaking cation, limited by any adverse effects such an excess may have on the desired photographic or other characteristics of the system. In general, the range will be 0.5 to 15 moles, and preferably 2.0 to 12.0 moles, of complex-breaking cation in the second (overcoat) layer per mole of hardening cation in the first (base) layer.

In practicing this invention, the ingredients of the emulsion may be mixed in any convenient and suitable manner, which is not critical and does not form a part of the invention. Ordinarily, it will be desirable first to dissolve or disperse the polymeric binding agent, and thereafter to mix in the complexing agent and a salt of the first multivalent cation. It will be evident that each of these may also be introduced as a previously prepared solution in a solvent that is the same as, or is compatible with the solvent or the dispersing medium used for the polymeric binder. It will also be evident that the first multivalent cation and the complexing agent may first be combined in known manner to form a solution containing the complex, which is then added to the solution or dispersion of the polymeric binding agent. In an alternative embodiment, as already observed, the first (i.e., crosslinking) multivalent cation and the complexing agent may be reserved for later application and the second (i.e., complex-breaking) multivalent cation may be incorporated in the original emulsion, conveniently in the form of a soluble salt.

In the preferred embodiment of a gelatino silver halide emulsion, the emulsion may be made by any of the procedures ordinarily employed in the photographic art to combine gelatin, water, silver halide grains, sensitizers, stabilizers, coating aids, and the like. As may be appropriate for a given selection of ingredients and/or a given desired end product, the preparative steps may involve such operations as mixing, digesting, washing, redispersing, chilling and remelting in any desired combination or sequence. The point at which the first multivalent cation and the complexing agent (or the previously prepared solution of the complex) are added is not critical. They may be added at an early stage of the mixing or they may be added as a last step to an emulsion that has been otherwise completely prepared and is ready for coating. It is essential only that they be added at such a point and in such a way as to insure their uniform distribution throughout the emulsion.

It will be recognized that it may also be necessary to adjust the pH of the emulsion to enhance the stability of the complex of the first multivalent cation, to avoid unwanted disturbance of the photochemistry of the silver halide system, and to permit maximum effectiveness of the crosslinking reaction when the first multivalent cation is ultimately released from its complex. For example, when the preferred trivalent chromium is used as the crosslinking cation, the pH of the emulsion should be maintained on the slightly acid side. Excessive acidity will retard the crosslinking reaction, whereas alkalinity will defeat it by precipitating chromium hydroxide in the system. When the preferred acid complexing agents are used, excessive acidity can be avoided by using the alkali metal salts of the acids rather than the acids themselves, or the pH can be brought back to the desired level by additions of NaOH or any other alkaline agent that will not disturb the desired photochemical characteristics of the silver halide system.

The prepared emulsion may be formed into either a self-supporting layer or a supported layer by a wide variety of casting, coating or extrusion techniques. The exact manner of forming the layer is not a part of the invention, but can readily be selected by those skilled in the art on the basis of such factors as the nature and mechanical characteristics of the polymeric binder (e.g., its capability for forming a self-supporting thin film), the viscosity and other rheological properties of the emulsion (hence, its amenability to casting, coating or extruding), and the nature of the final desired product. Likewise, when the emulsion is formed into a supported layer, the substrate may be either rigid or flexible, and either opaque or transparent, depending on the intended end product.

In the preferred embodiment relating to a gelatino silver halide emulsion, the layer will ordinarily be a supported layer coated by any of several known techniques (e.g., knife coating, roller coating, skim coating, air-knife or air-doctor coating) on a substrate which may be, for example, paper or any of the flexible, transparent sheets of natural or synthetic polymeric material commonly employed for photographic films, e.g., cellulose, cellulose acetate, cellulose nitrate, polyethylene terephthalate. The substrate may previously have been given one or more of the usual coatings on one or both sides, such as antihalation layers, adhesive layers, or any of the other various subbing coatings known in the art. After coating, the emulsion layer may optionally be dried, again by conventional procedures, the exact method, time and temperature of drying being governed by the specific characteristics of the drying equipment and by the nature of the emulsion, all according to principles readily recognized by those practicing this art.

The second multivalent cation is then introduced into the formed layer of emulsion either before or after the layer has been dried. It will generally be found convenient to effect this introduction by use of a solution of a salt of the cation. A variety of methods may be employed. If the formed emulsion layer has been dried, it may then be immersed in or passed through a bath containing the cation, or it may be given a coating by usual procedures. When the initial emulsion layer is formed by a coating technique, a tandem wet-overcoating procedure may be used to apply the solution of the second multivalent cation before the first coating has dried. To facilitate uniform application, the solution of the second multivalent cation may contain a polymeric binder or thickener which may be, but is not necessarily, the same polymeric binder as employed for the initial emulsion. The exact manner of introducing the second multivalent cation is not a part of the invention. It is important only that the method chosen be one that permits uniformity of application and encourages migration or diffusion of the second multivalent cation into the formed emulsion layer. In the preferred embodiment relating to gelatino silver halide emulsions, the layer will be formed by coating, may be dried, and then will be overcoated with another gelatin emulsion containing dispersed therein a salt of the second multivalent cation.

The time interval which may elapse between the original formation of the emulsion layer and the subsequent introduction of the second multivalent cation is not critical and is not a feature of the invention. While the time factor may be important in some instances because of the nature of the specific materials employed, it is not inherently important with respect to the steps of the inventive process per se.

The essential steps of the present invention are completed with the introduction of the second multivalent cation into the emulsion layer and the consequent release of the first multivalent cation from its complex, whereupon the first multivalent cation enters into crosslinking reactions with the molecules of the polymeric binder, with the ultimate effect of hardening the emulsion layer. It will be understood, however, that additional steps may follow in actual practice. For example, when the second multivalent cation is introduced in the form of a liquid medium, as will usually be convenient, a final drying step will generally be used. Also, upon completion of the steps of this invention, the emulsion layer may be given additional coatings or subjected to other treatments unrelated to the objects of this invention and determined by the particular end-use requirements of a given emulsion layer.

The invention will be further described by the examples hereafter, which are to be regarded as illustrative rather than limiting. The examples show the application of the invention to the hardening of a gelatino silver halide emulsion. The same starting emulsion was used for all the examples. This emulsion, hereafter called the "basic emulsion" was a gelatino silver bromoiodide X-ray emulsion containing 98.8 mole percent of AgBr and 1.2 mole percent of AgI. This emulsion was coagulated, washed, and redispersed by the method described in U.S. Pat. 2,772,165. The redispersed emulsion, comprising approximately 115 grams of gelatin per 1.5 mole of silver, was sensitized with gold and sulfur compounds in the conventional manner. After digestion, the emulsion was cooled and stabilizers and coating aids were added.

Portions of this basic emulsion were then taken for use as described in the examples. The first (crosslinking) multivalent cation in all the examples was trivalent chromium, added to the emulsions as a 10% (by weight) aqueous solution of chrome alum $[CrK(SO_4)_2 \cdot 12H_2O]$. Various complexing agents were used, as indicated hereafter. Where necessary, pH of the emulsions was adjusted by addition of NaOH solution. The reported viscosity values are relative and indicate the time in seconds for a unit volume of each emulsion to drain through an orifice of constant diameter at 95 F. (35° C.). Each of the emulsion samples was coated by conventional procedures on subbed 0.04-inch-thick polyethylene terephthalate film and the coating was then dried to give a dry coating weight (expressed as AgBr) of approximately 80 mg./dm.$^2$.

For the introduction of the second (complex-breaking) multivalent cation, the salts indicated in the examples were dispersed in a second emulsion comprising 2.2% by weight of gelatin in water and conventional adjuvants such as coating aids and wetting agents. These emulsions (identified hereafter as "overcoat emulsions") were then coated by conventional procedures over the previously prepared and dried films, and then dried to a dry coating weight (expressed as gelatin) of approximately 10 mg./dm.²

For each of the final films, the dgree of hardening achieved was determined by the conventional "melting point" procedure, wherein a strip of the film was immersed in distilled water and the temperature of the water was slowly raised until the emulsion dissolved or disintegrated. The temperature of the water when solution or disintegration occurred was recorded and is reported herein as the melting point. Melting point is, of course, directly related to the degree of crosslinking of the polymeric binder: the higher the melting point, the more extensive the crosslinking, hence, the more effective the hardening of the emulsion. For simplicity in presentation, the melting points for the non-overcoated films may be recorded in connection with the overcoated sample to which each is related, but it will be understood that the non-overcoated samples are not examples of this invention.

EXAMPLES I-III

Ten 0.2-unit (one unit=1.5 mole Ag halide) portions of the basic emulsion previously described were taken, and additions of chrome alum and citric acid were made as indicated in Table 1. Each of the emulsions was adjusted to a pH of 6.3 by addition of NaOH solution. Viscosity of the fresh emulsions was determined in every case, and, for some of the emulsions, after standing for four hours at 95° F. and again after chilling at about 35° F. for twenty hours and remelting. Seven of the ten emulsions thus prepared were controls representative of the prior art, since they did not contain one or more of the ingredients essential in the practice of this invention. Four were not cast into films, in some cases because of excessively high viscosity. Each of the remaining six emulsions was coated on a polyethylene terephthalate supporting film, in the manner already described, and dried. Three of these films were overcoated with an emulsion comprising 2.2% by weight of gelatin in water, to which had been added aluminum alum

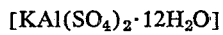
[KAl(SO₄)₂·12H₂O]

to the extent of 1.5 g. per 10 g. of gelatin, and were then dried. The pH of the overcoat emulsion was 6.0. Melting points were determined, in the manner already described, for all of the films, and are given in Table 1.

Control A shows what may be termed the "natural" viscosity of the basic emulsion and shows that this property changes only very slowly on storage. Controls B and D show the characteristic prior art effect of substantial increase in viscosity that results from crosslinking of the gelatin molecules when a multivalent crosslinking cation, here Cr⁺³, is incorporated in the emulsion. Controls C, E, F, and G and Examples I-III show the further prior art effect of controlling the amount of crosslinking by addition of a complexing agent, here citric acid. It will be seen that, for a given Cr⁺³ content, the crosslinking effect is depressed in direct relation to the amount of complexing agent added. Thus, the viscosity of the emulsion for Example III, with the highest content of citric acid, is the same as the "natural" viscosity of the basic emulsion, Control A.

It will further be seen, however, that this prior art approach to control of viscosity has a decidedly adverse effect on the hardness of the coatings made from the emulsions. Control films E-G without overcoating have melting points so low as to present serious problems in practical present-day photographic processing operations, e.g., high-speed, rapid-access, automated processing of medical X-ray films, where an important factor in achieving the desired speeds is the ability to process the films at temperatures substantially higher than the 65-70° F. that was long the standard for photographic processing operations.

By contrast, when the same formulations as Controls E-G are overcoated in Examples I-III, representative of this invention, all show a substantial (30-40%) elevation of melting point of the final product while retaining desirably low viscosities of the emulsions before coating. This desirable combination of effects is achieved by using an effective complexing agent to prevent the first multivalent cation crosslinking the emulsion prior to coating, and thereafter releasing the first multivalent cation from the complex by the introduction, via the overcoating, of a complex-breaking second multivalent cation, in these examples trivalent aluminum. In this way, the desired crosslinking occurs in the film rather than in the emulsion, giving the desirable hardness to the film while obviating the difficulties inherent in casting or coating high-viscosity emulsions.

TABLE 1

|  | Control |  |  |  |  |  |  | Example |  |  |
|---|---|---|---|---|---|---|---|---|---|---|
|  | A | B | C | D | E | F | G | I | II | III |
| Additions to basic emulsion, g./100 g. gelatin: |  |  |  |  |  |  |  |  |  |  |
| Chrome alum |  | 1.30 | 1.30 | 1.74 | 1.74 | 1.74 | 1.74 | 1.74 | 1.74 | 1.74 |
| Citric acid |  |  | 0.87 |  | 0.44 | 0.87 | 1.30 | 0.44 | 0.87 | 1.30 |
| Relative Viscosity at 95° F., seconds: |  |  |  |  |  |  |  |  |  |  |
| Fresh | 31 | 42 | 31 | 43 | 36 | 33 | 31 | 36 | 33 | 31 |
| After 4 hrs. at 95° F | 32 | 45 | 33 |  |  |  |  |  |  |  |
| Chilled and remelted | 36 | 68 | 36 |  |  |  |  |  |  |  |
| Addition to overcoat emulsion, g./10 g. gelatin: Aluminum alum |  |  |  |  |  |  |  | 1.5 | 1.5 | 1.5 |
| Final film: Melting point, °F |  |  |  |  | 114 | 108 | 96 | 162 | 160 | 136 |
| Additives in moles/dm.² (×10⁻⁶): |  |  |  |  |  |  |  |  |  |  |
| (a) Chrome alum |  | 0.853 | 0.853 | 1.137 | 1.137 | 1.137 | 1.137 | 1.137 | 1.137 | 1.137 |
| (b) Aluminum alum |  |  |  |  |  |  |  | 3.162 | 3.162 | 3.162 |
| Molar ratio (b)/(a) |  |  |  |  |  |  |  | 2.78 | 2.78 | 2.78 |

EXAMPLES IV-VI

Examples I-III were repeated except that the overcoating emulsion contained NiCl₂·6H₂O (1.5 g. per 10 g. of gelatin) in place of aluminum alum. The film samples used for overcoating in Examples IV-VI correspond respectively to the samples used in Examples I-III, i.e., the films of Controls E-G. The final overcoated films contained 6.31×10⁻⁶ moles NiCl₂·6H₂O/dm.², with a molar ratio of release agent to hardener of 5.55. Melting points of Examples IV-VI with the Ni⁺²-containing overcoating were:

Example IV—163° F.
Example V—152° F.
Example VI—130° F.

When compared with non-overcoated Controls E-G, it will be seen that incorporation of the complex-breaking nickel ions by way of the overcoating released the chromium ions to effect crosslinking resulting in a 35-50% increase in melting point.

EXAMPLES VII-IX

Examples VII-IX likewise correspond respectively to Examples I-III except that the overcoating emulsion contained ZnCl₂ (1.5 g. per 10 g. of gelatin) in place of aluminum alum. The final overcoated films contained $11 \times 10^{-6}$ moles $ZnCl_2/dm.^2$, and the molar ratio of release agent to hardener was 9.675. The melting points of the overcoated films, which should be compared with nonovercoated Controls E–G respectively, were:

Example VII—156° F.
Example VIII—146° F.
Example IX—120° F.

Thus, $Zn^{+2}$ in sufficient amount also effectively broke the $Cr^{+3}$-citrate complex to permit crosslinking and hardening of the overcoated films.

EXAMPLES X–XII

To a number of 0.2-unit portions of the basic emulsion already described there were added the amounts of chrome alum and citiric acid shown in Table 2. In each instance, pH was adjusted to 6.3 by addition of NaOH solution, and viscosity was determined. Two of the resulting emulsions, Controls K and L, had such high viscosities that they could not be coated. The remaining emulsions were coated in the manner previously described, dried, then overcoated with a 2.2 weight percent gelatin emulsion containing aluminum alum to the extent of 1.67 g. per 10 g. of gelatin, and dried. Melting points of the emulsions before and after overcoating are given in Table 2.

TABLE 2

|  | Control | | Example | | Control | Example |
|---|---|---|---|---|---|---|
|  | H | K | X | XI | L | XII |
| Additions to basic emulsion, g./100 g. gelatin: | | | | | | |
| Chrome alum | 0 | 1.74 | 1.74 | 1.74 | 2.61 | 2.61 |
| Citric acid | 0 | 0 | 0.44 | 0.87 | 0.44 | 0.87 |
| Relative viscosity at 95° F., seconds | 31 | 61 | 45 | 36 | 53 | 41 |
| Addition to overcoat emulsion, g./10 g. gelatin: Aluminum alum | 1.67 | | 1.67 | 1.67 | | 1.67 |
| Final film melting point, ° F.: | | | | | | |
| Without overcoating (control) | *92 | | *136 | *118 | | *154 |
| With overcoating | *124 | | 180 | 162 | | 182 |
| Additives in moles/dm.² ($\times 10^{-6}$): | | | | | | |
| (a) Chrome alum | 0 | | 1.137 | 1.137 | | 1.706 |
| (b) Aluminum alum | 3.52 | | 3.52 | 3.52 | | 3.52 |
| Molar ratio (b)/(a) | | | 3.1 | 3.1 | | 2.06 |

*Not examples of the invention.

Controls K and L show that an undesirably extensive crosslinking of the emulsion occurs, indicated by high viscosity, when relatively large amounts of chrome alum are used in conjunction with no or only a little complexing agent. Control H, containing no $Cr^{+3}$, shows an appreciable elevation of melting point for the overcoated sample because $Al^{+3}$ is itself an effective crosslinking cation for gelatin molecules. By comparison, however, Examples X–XII show a very substantial additional hardening when the $Cr^{+3}$ is released from its citrate complex by the action of at least part of the $Al^{+3}$ in the overcoating. Examples X–XII also show that, because of the relative amounts of chrome alum and citric acid used, only part of the $Cr^{+3}$ is complexed in the emulsion, the remainder being free to effect an appreciable degree of crosslinking, as evidenced by the viscosities of the emulsion and by the melting points of the nonovercoated films. In particular, Examples X–XII show that very high melting points, suitable for the requirements of present-day high-speed photographic processing, can be achieved by the practice of the present invention.

In all of the foregoing examples, the complexing agent employed was citric acid. Another effective complexing agent is tartaric acid. Four 0.2-unit portions of the basic emulsion were taken and additions were made as indicated in Table 3.

TABLE 3

| Control | M | N | O | P |
|---|---|---|---|---|
| Additions to basic emulsion, g/100 g. gelatin: | | | | |
| Chrome alum | | 1.74 | 1.74 | 1.74 |
| Citric acid | | | 0.44 | |
| Tartaric acid | | | | 0.44 |
| Relative viscosity at 95° F., seconds | 34 | 69 | 39 | 42 |

The "natural" viscosity of the basic emulsion (Control M) is greatly elevated when chrome alum is added with no complexing agent. Thus, Control N could not be remelted after conventional chilling, whereas Controls M, O, and P were readily remelted and coated. Comparison of Controls O and P shows that citric and tartaric acids are substantially equally effective complexing agents for $Cr^{+3}$ in this basic emulsion.

EXAMPLES XIII–XVI

As earlier observed, and as illustrated by Examples XIII–XVI, the alkali metal salts of the acids may be used as complexing agents in the place of the acids. These examples also illustrate the use of other complex-breaking cations in the overcoating. The same basic emulsion and the general procedures of the preceding example were used. Compositions of the emulsions and properties of the films are given in Table 4. The primary emulsions were maintained at pH 6.3 and the overcoating emulsions at pH 6.0. Three different overcoating emulsions were used, all at 2.2% by weight gelatin, with addition of the salts indicated in Table 4 to the extent also shown in Table 4.

TABLE 4

| Example | XIII | XIV | XV | XVI |
|---|---|---|---|---|
| Additions to basic emulsion, g./100 g. gelatin: | | | | |
| Chrome alum | 1.74 | 1.74 | 1.74 | 1.74 |
| Potassium citrate | 0.65 | 1.30 | | |
| Potassium tartrate | | | 1.30 | 1.96 |
| Relative viscosity at 95° F., sec | 45 | 38 | 46 | 41 |
| Melting point, ° F., with overcoating: | | | | |
| None (control; not examples of invention) | 126 | 108 | 118 | 114 |
| Aluminum alum (1.7 g./10 g. gel) | 165 | 152 | 163 | 157 |
| $CaCl_2 \cdot 2H_2O$ (2 g./10 g. gel) | 165 | 152 | 163 | 155 |
| $MgCl_2 \cdot 6H_2O$ (2 g./10 g. gel) | 164 | 152 | 162 | 157 |

All of the final films contained chrome alum to the extent of $1.37 \times 10^{-6}$ moles/dm.². For the three different release or complex-breaking agents in the overcoats, the content of release agent and the molar ratio of release agent to chrome alum hardener were as follows:

|  | Moles/dm.² ($\times 10^{-5}$) | Molar ratio, release/hardener |
|---|---|---|
| $KAl(SO_4)_2 \cdot 12H_2O$ | 3.58 | 3.15 |
| $CaCl_2 \cdot 2H_2O$ | 13.6 | 11.96 |
| $MgCl_2 \cdot 6H_2O$ | 9.84 | 8.65 |

It is apparent from the data in Table 4 that potassium citrate and potassium tartrate in the relative amounts used are effective in depressing the crosslinking effect of chrome alum so that emulsion viscosity is maintained at a manageable level. It is also apparent that $Al^{+3}$, $Ca^{+2}$, and $Mg^{+2}$ are essentially equivalent in their ability to break the $Cr^{+3}$ complexes so that hardening of the overcoated emulsion can occur, as shown by the substantial and remarkably uniform elevation of melting point. These examples illustrate the flexibility of the invention and the latitude of the control it provides for achieving a given melting point by appropriate adjustment of the kinds and amounts of ingredients.

EXAMPLES XVII–XVIII

These examples illustrate the use of still another effective complexing agent, picolinic acid. The base emulsion and the procedures of previous examples were used. Compositions and properties are given in Table 5. The primary emulsions were maintained at pH 6.3 and the overcoating emulsion at 6.0. The 2.2 weight percent gelatin overcoating emulsion contained aluminum alum to the extent of 1.5 g. per 10 g. of gelatin.

TABLE 5

|  | Control R | Example XVII | Example XVIII |
|---|---|---|---|
| Additions to basic emulsion, g./100 g. gelatin: |  |  |  |
| Chrome alum (as 10% aq. sol.) |  | 1.74 | 1.74 |
| Picolinic acid |  | 2.61 | 4.35 |
| Relative viscosity at 95° F., sec.: |  |  |  |
| Fresh | 36 | 38 | 37 |
| After chilling (~35° F., 16 hours.) and remelting | 36 | 40 | 37 |
| Final film melting point, ° F.: |  |  |  |
| Without overcoating (control, not example of invention) | 98 | 126 | 110 |
| With overcoating | 102 | 170 | 150 |
| Additives in mole/dm.² (×10⁻⁵): |  |  |  |
| (a) Chrome alum |  | 1.137 | 1.137 |
| (b) Aluminum alum | 3.162 | 3.162 | 3.162 |
| Molar ratio, (b)/(a) |  | 2.78 | 2.78 |

It will be seen that picolinic acid operated effectively to complex the $Cr^{+3}$ and prevent undesirable viscosity increase over the "natural" viscosity of Control R, but readily permitted the breaking of the complex by $Al^{+3}$ introduced by way of overcoating. Thus, by the practice of this invention, final films with desirably high melting points (up to 70% increase over unhardened film; cf. Control R and Example XVII) were produced.

In all of the foregoing examples, the inclusion of the various hardening, complexing and release agents and their use to harden the emulsions according to the process of this invention, had no adverse effect on film speed, sensitometry, or other photographic characteristics of the emulsions.

While the invention has been described herein in terms of an emulsion and an overcoating, it is to be understood that the combination of an emulsion and an undercoating (rather than an overcoating) is also within the scope of the invention. Thus, a substrate may be coated with a material containing the complex-breaking cations or the hardening cations/complexing agent combination and the emulsion layer formed on the coated substrate. In this embodiment, the undercoating may serve only the hardening function of this invention, or it may combine that function with other functions for which undercoatings may be employed. Such a combination might be useful, for example, in the manufacture of photographic elements, where an additional coating step could be avoided by incorporating either the complex-breaking cations or the hardening cations/complexing agent combination in one of the undercoatings commonly employed in photographic elements, e.g., an antihalation coating or a subbing coating to improve adhesion of the gelatino silver halide emulsion to a substrate. In this alternative embodiment, it will be required, of course, that the additives required for the present invention be chemically, physically, and photographically compatible with the other components of the undercoating and that neither set of components interfere with the effective functioning of the other.

From all the foregoing, it will be seen that the present invention provides a method for taking advantage of the capability of multivalent cations to crosslink polymer molecules, hence, to harden layers formed from such polymers, while avoiding the practical problems that have heretofore arisen because of the increase in viscosity associated with crosslinking. By the use of complexing agents and complex-breaking cations as described herein, the crosslinking agent can be incorporated in the emulsion in a way to insure its uniform distribution, but held in reserve until a point in the manufacturing operations where high viscosity will no longer be a problem. Because the crosslinking agent is distributed uniformly throughout the emulsion, the crosslinking or hardening is more uniform than that achieved by prior art procedures of coating the hardening agent on the dried layer.

The invention has been illustrated primarily in terms of photographic films having an emulsion based on gelatin, but it will be seen readily that the invention can be applied to any situation where it is desired to harden a polymeric structure, especially but not restrictively a thin film. The invention does not reside in any particular end use or product, but in the procedure of complexing all or part of the crosslinking agent and subsequently releasing it, such as by introduction of other multivalent cations that displace it from the complex.

I claim:

1. A process for hardening polymeric emulsions having reactive sites available for crosslinking through multivalent cations comprising producing first, crosslinking, multivalent cations selected from the group consisting of chromium, titanium and zirconium in the emulsion by release of said first, crosslinking, multivalent cations from complex with a complexing agent, said first, crosslinking, multivalent cations being released from complex by displacement with second multivalent cations selected from the group consisting of magnesium, calcium, nickel, aluminum, zinc, cadmium and cobalt.

2. A process according to Claim 1 wherein the polymer of the emulsion is selected from the group consisting of gelatin, polyvinyl alcohol, polyvinyl acetate, polyvinyl ethers, polyvinyl acetals containing intralinear

—CH₂—CHOH—

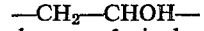

groups, and interpolymers of vinyl acetate and unsaturated addition-polymerizable compounds.

3. A process according to Claim 1 wherein the first, crosslinking, multivalent cations are trivalent chromium.

4. A process according to Claim 1 wherein the polymer of the emulsion is gelatin.

References Cited

UNITED STATES PATENTS

| 3,720,562 | 3/1973 | Drehlich | 260—29.6 BM |
| 2,680,108 | 6/1954 | Schmidt | 260—429.5 |
| 3,409,578 | 11/1968 | Hwa | 260—29.6 MM |
| 3,257,280 | 6/1966 | Richter | 106—125 |
| 3,535,147 | 10/1970 | White | 96—111 |

THEODORE MORRIS, Primary Examiner

U.S. Cl. X.R.

96—111, 114.7; 106—135; 117—34; 260—29.6 B, 29.6 MM, 29.6 BM

UNITED STATES PATENT OFFICE
CERTIFICATE OF CORRECTION

Patent No. 3,832,197  Dated August 27, 1974

Inventor(s) Joseph DeWitt Overman

It is certified that error appears in the above-identified patent and that said Letters Patent are hereby corrected as shown below:

Column 2, line 25, after "hardening" insert --)--.

Column 3, line 73, change "protochemistry" to --photochemistry--.

Column 4, line 27 - after "should" insert --not--.

Column 10, line 54, change "$CaCl_2 2H_2O$" to --$CaCl_2 \cdot 2H_2O$--.

Column 10, line 55, change "$MgCl_2 6H_2O$" to --$MgCl_2 \cdot 6H_2O$--.

Column 10, line 58, change "1.37" to --1.137--.

Signed and Sealed this fifth Day of August 1975

[SEAL]

Attest:

RUTH C. MASON
Attesting Officer

C. MARSHALL DANN
Commissioner of Patents and Trademarks